United States Patent
Chang et al.

(10) Patent No.: US 12,436,762 B2
(45) Date of Patent: *Oct. 7, 2025

(54) TECHNIQUES FOR USE OF A LARGE SCALE MULTI-LITERAL MATCHING ALGORITHM

(71) Applicant: Intel Corporation, Santa Clara, CA (US)

(72) Inventors: Hao Chang, Shanghai (CN); Xiang Wang, Shanghai (CN); Yang Hong, Shanghai (CN); Wenjun Zhu, Shanghai (CN); Kun Qiu, Shanghai (CN); Baoqian Li, Shanghai (CN)

(73) Assignee: Intel Corporation, Santa Clara, CA (US)

(*) Notice: Subject to any disclaimer, the term of this patent is extended or adjusted under 35 U.S.C. 154(b) by 774 days.

This patent is subject to a terminal disclaimer.

(21) Appl. No.: 17/559,752

(22) Filed: Dec. 22, 2021

(65) Prior Publication Data

US 2022/0113969 A1  Apr. 14, 2022

(51) Int. Cl.
*G06F 9/30* (2018.01)
*G06F 9/38* (2018.01)

(52) U.S. Cl.
CPC ...... *G06F 9/30032* (2013.01); *G06F 9/30018* (2013.01); *G06F 9/30036* (2013.01); *G06F 9/30038* (2023.08); *G06F 9/3887* (2013.01)

(58) Field of Classification Search
CPC ............ G06F 9/30032; G06F 9/30018; G06F 9/30036; G06F 9/30038; G06F 9/3887
See application file for complete search history.

(56) References Cited

U.S. PATENT DOCUMENTS

| | | | |
|---|---|---|---|
| 8,527,272 B2 | 9/2013 | Qin et al. | |
| 10,128,868 B1* | 11/2018 | Gopal | H03M 7/6011 |
| 2008/0022403 A1 | 1/2008 | Chen et al. | |
| 2014/0281371 A1* | 9/2014 | Thantry | G06F 9/30036 712/7 |
| 2015/0026194 A1 | 1/2015 | Dziedzicki et al. | |
| 2021/0208888 A1 | 7/2021 | Chang et al. | |

OTHER PUBLICATIONS

Wang, Xiang et al., "Hyperscan: A Fast Multi-pattern Regex Matcher for Modern CPUs", This paper is included in the Proceedings of the 16th USENIX Symposium on Networked Systems Design and Implementation (NSDI '19), Feb. 26-28, 2019, Boston, MA, USA, 19 pages.

* cited by examiner

*Primary Examiner* — Farley Abad
(74) *Attorney, Agent, or Firm* — Compass IP Law PC

(57) ABSTRACT

Examples include techniques four use of a large scale multi-literal matching algorithm. Implementation of the large scale multi-literal matching algorithm includes processing a chunk of input data via performance of a SHIFT-OR operation using the chunk of input data to identify a match candidate for a target literal character pattern. A single input multiple data (SIMD) instruction may be utilized by a processor to perform the SHIFT-OR operation as a parallel table lookup of rows of SHIFT-OR mask table for the chunk of input data to facilitate identification of the match candidate.

19 Claims, 15 Drawing Sheets

300

| Pattern | f | d | r | h | a | r | r | y |
|---|---|---|---|---|---|---|---|---|
| Reverse | y | r | r | a | h | r | d | f |
| Offset | 0 | 1 | 2 | 3 | 4 | 5 | 6 | 7 |
| 0x00 | 1 | 1 | 1 | 1 | 1 | 1 | 1 | 1 |
| ... | ... | ... | ... | ... | ... | ... | ... | ... |
| a | 1 | 1 | 1 | 0 | 1 | 1 | 1 | 1 |
| ... | ... | ... | ... | ... | ... | ... | ... | ... |
| d | 1 | 1 | 1 | 1 | 1 | 1 | 0 | 1 |
| e | 1 | 1 | 1 | 1 | 1 | 1 | 1 | 1 |
| f | 1 | 1 | 1 | 1 | 1 | 1 | 1 | 0 |
| g | 1 | 1 | 1 | 1 | 1 | 1 | 1 | 1 |
| h | 1 | 1 | 1 | 1 | 0 | 1 | 1 | 1 |
| ... | ... | ... | ... | ... | ... | ... | ... | ... |
| r | 1 | 0 | 0 | 1 | 1 | 0 | 1 | 1 |
| ... | ... | ... | ... | ... | ... | ... | ... | ... |
| y | 0 | 1 | 1 | 1 | 1 | 1 | 1 | 1 |
| ... | ... | ... | ... | ... | ... | ... | ... | ... |
| 0xff | 1 | 1 | 1 | 1 | 1 | 1 | 1 | 1 |

| Symbol | Hex. (Extended) | Bin. (Extended) | Low 6-bit | Hex. (Simplified) |
|---|---|---|---|---|
| f | 0x66 | 01100110 | 1001100 | 0x26 |
| d | 0x64 | 01100100 | 100100 | 0x24 |
| r | 0x72 | 01110010 | 110010 | 0x32 |
| h | 0x68 | 01101000 | 101000 | 0x28 |
| a | 0x61 | 01100001 | 100001 | 0x21 |
| r | 0x72 | 01110010 | 110010 | 0x32 |
| r | 0x72 | 01110010 | 110010 | 0x32 |
| y | 0x79 | 01111001 | 111001 | 0x39 |

TECHNIQUES FOR USE OF A LARGE SCALE MULTI-LITERAL MATCHING ALGORITHM

CROSS-REFERENCE TO RELATED APPLICATIONS

This application claims the benefit of priority to Patent Cooperation Treaty (PCT) Application No. PCT/CN2021/133026 filed Nov. 25, 2021. The entire content of that application is incorporated by reference.

BACKGROUND

Literal matching is widely used in scenarios such as network I/O (Input/Output), network intelligence, intrusion detection and prevention (IDS/IPS), deep packet inspection (DPI), web application firewall (WAF), etc. An example of a type of multi-pattern or multi-literal regular expression (regex) matching system is known as Hyperscan. Hyperscan is a high-performance regex matching library, and its use of multi-literal matching algorithms is described in detail in a whitepaper authored by Wang, Xiang, et al. "Hyperscan: a fast multi-pattern regex matcher for modern CPUs." 16th {USENIX} Symposium on Networked Systems Design and Implementation (NSDI '19), February 2019. A multi-literal matching algorithm described in the Hyperscan whitepaper is named "FDR." The FDR algorithm is a SIMD (Single Instruction Multiple Data) accelerated multiple-string matching algorithm.

The FDR algorithm implements an extended SHIFT-OR operation that applies SIMD instructions to find match candidates in input data. Implementations of the FDR algorithm for large scale multi-literal matching requires a table lookup operation for each input character on a byte by byte basis to prepare masks used by the extended SHIFT-OR operation and performance of SHIFT-OR for every 8-byte chunk at a time. Performance of SHIFT-OR for every 8-byte chunk at a time for large scale multi-literal matching may slow data processing to find and verify matching candidates and becomes a bottleneck when implementing the FDR algorithm. The 8-byte chunk FDR algorithm is an improvement over other types of large scale multi-literal matching algorithm such as the Aho-Corasick (AC) algorithm. The AC algorithm uses a variant of deterministic finite automaton (DFA) for multi-string matching. But the AC algorithm performs byte by byte operations that require more time to perform than the 8-byte chunk SHIFT-OR operations used by the FDR algorithm.

BRIEF DESCRIPTION OF THE DRAWINGS

FIG. 3 illustrates an example diagram of a SHIFT-OR mask table for the FDR algorithm.

FIG. 6 illustrates an example table for low 6-bit binary values from extended binary values for American Standard Code for Information Interchange (ASCII) symbols used to determine hexadecimal values for use in a simplified, SHIFT-OR mask table for implementing the HARRY algorithm.

FIG. 10 illustrates an example diagram of a false positive at the 0-bit position of a SHIFT-OR result for the HARRY algorithm.

DETAILED DESCRIPTION

According to some examples, when implementing the AC or FDR algorithms for large scale multi-literal matching (e.g., in a Hyperscan system), performance of SHIFT-OR for every byte or 8-byte chunk at a time may unacceptably slow data processing of input data to find and verify matching candidates. Hence, implementation of either algorithm may result in a performance bottleneck when using large scale multi-literal matching algorithms in such deployments that may include, but are not limited to, network I/O, network intelligence, IDS/IPS, DPI, or WAF. As described more below, use of an improved large scale multi-literal matching algorithm referred to as the HARRY algorithm applies SIMD instructions to process a significantly larger chunk of input data at a time compared to the AC and FDR algorithms in order to reduce data processing times of input data to find and verify matching candidates.

Figure 1:
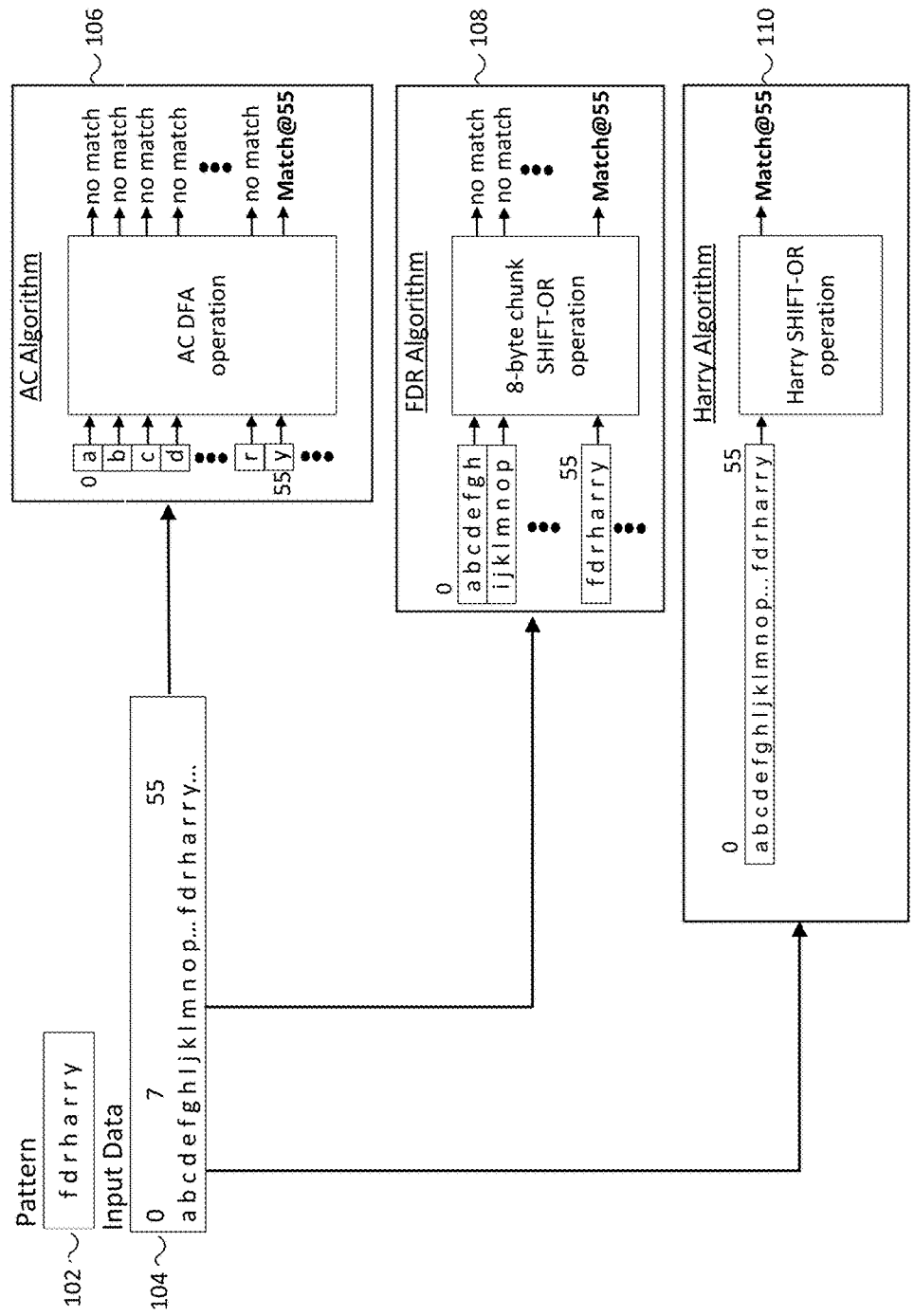
FIG. 1 illustrates an example comparison of multi-literal algorithms.

FIG. 1 illustrates an example comparison 100 of multi-literal algorithms. As shown in FIG. 1, the multi-literal algorithms include an AC algorithm 106, an FDR algorithm 108 and a HARRY algorithm 110. In some examples, comparison 100 shows how these three large scale multi-literal matching algorithms process input data 104 to find a match for pattern 102 that includes 'f d r h a r y'. For these examples, as shown in FIG. 1, input data 104 includes the last character 'y' that matches pattern 102 'f d r h a r r y' at byte position 55.

As mentioned above, AC algorithms performs byte by byte operations for multi-string matching. So input data 104 would be processed byte by byte by AC algorithm 106 until the last character of 'y' at byte 55 is processed and matched. In other words, 56 bytes are processed before AC algorithm 106 identifies a match in input data 104 for pattern 102. Also, as mentioned above, FDR algorithms perform 8-byte chunk SHIFT-OR operations. So input data 104 would be processed at 8-byte chunks by FDR algorithm 108 until matching 'f d r h a r r y' in the $7^{th}$ 8-byte chunk.

As described more below, an improved large scale multi-literal matching algorithm shown in FIG. 1 as HARRY algorithm 110 may be used to process all bytes included in input data 104 in a parallel manner by utilizing a SIMD instruction to facilitate parallel processing to identify a match in input data 104 for pattern 102 in a substantially faster manner when compared to AC algorithm 106 or FDR algorithm 108.

Figure 2:
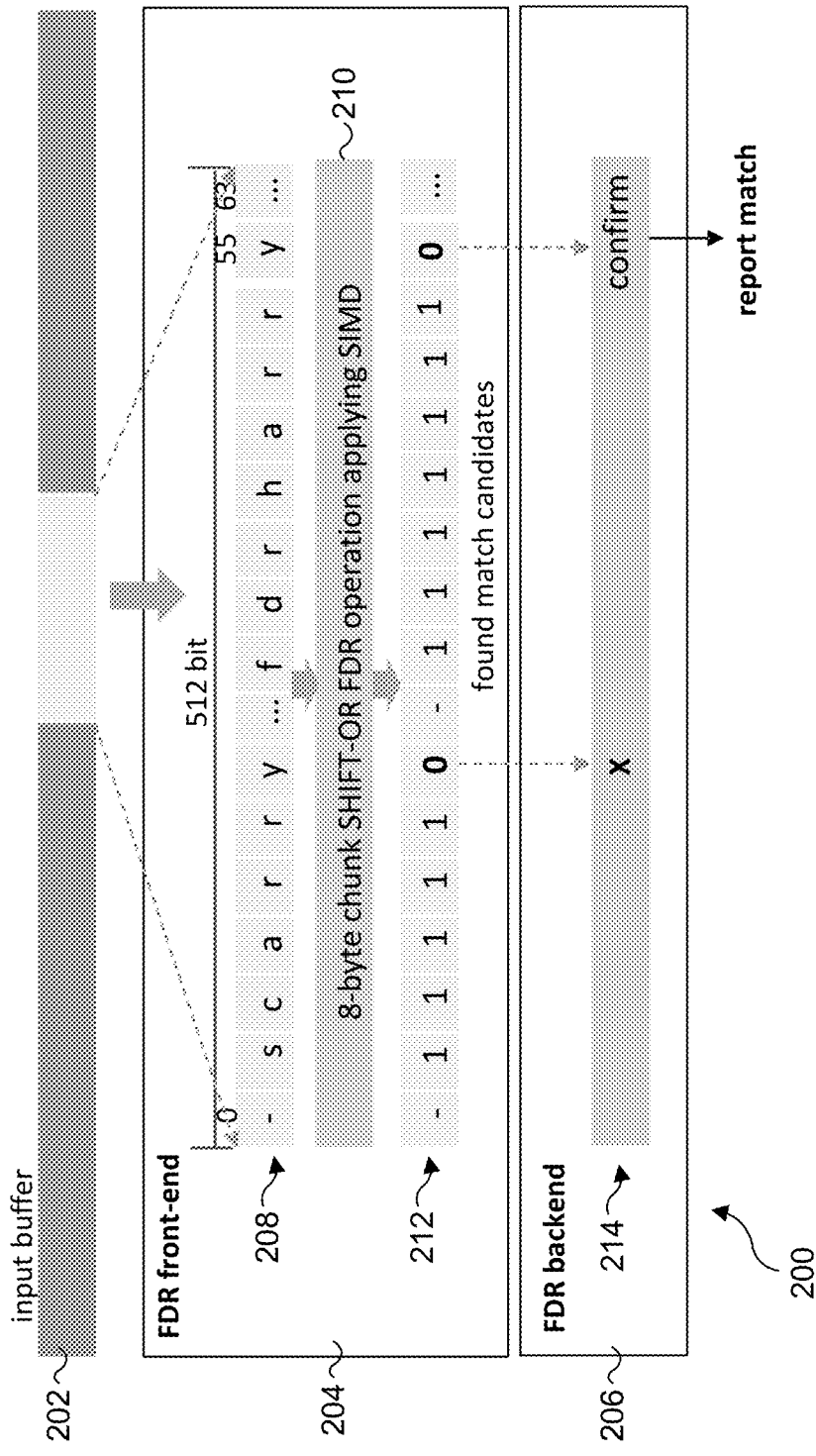
FIG. 2 illustrates an example diagram for a high-level workflow for an FDR algorithm.

FIG. 2 illustrates an example diagram 200 for a high-level workflow for an FDR algorithm. Implementation of the FDR algorithm as a multi-literal matching algorithm consists of two parts: a front-end and a back-end. The front-end uses SIMD instructions to filter out most data that do not generate any match, such that only match candidates will enter the back-end for confirmation. The back-end determines the final result: match or not. In some examples, as shown in FIG. 2, diagram 200 includes an input buffer 202 a front-end 204, and a back-end 206. A 512-bit/64-byte input string 208 (also referred to as a 512-bit/64-byte ' source vector') is sampled from an input buffer 202. For example, in a common implementation, input buffer 202 represents a sliding window (e.g., an input sample) of a byte stream (e.g., packetized data) that is being processed for matches. An 8-byte chunk SHIFT-OR operation 210 is applied to 512-bit/64-byte string 208 utilizing a SIMD instruction. For example, some Intel® Xeon® processors support execution of a 512-bit SIMD instruction for implementing a SHIFT-OR operation, such as, but not limited to, an Intel advanced vector extension 512-bit (AVX-512) SIMD instruction.

A SHIFT-OR operation finds all occurrences of a string pattern in the input string or byte stream sample by performing bit-wise SHIFT and OR operations. It uses two data structures—a shift-or mask for each character c ('c' stands for any character) in the symbol set, (sh-mask('c')), and a state mask(st-mask) for matching operation. sh-mask('c') zeros all bits whose bit position corresponds to the byte position of c in the string pattern while all other bits are set to 1. The bit position in a sh-mask is counted from the right most bit while the byte position in a pattern is counted from the left most byte. For example, for a string pattern, "aphp" sh-mask('p')=11110101 as 'p' appears at the second and the fourth position in the pattern. If a character is unused in the pattern, all bits of its sh-mask are set to 1. The algorithm keeps a st-mask whose size is equal to the length of a sh-mask. Initially, all bits of the st-mask are set to 1. The algorithm updates the st-mask for each input character, 'x' as st-mask=((st-mask<<1)|sh-mask('x')). For each matching input character, 0 is propagated to the left by one bit. If the zero bit position becomes the length of the pattern, it indicates that the pattern string is found.

The output of 8-byte chunk SHIFT-OR operation 210 generates a 512-bit/64-byte match pattern 212 that identifies (finds) match candidate(s) for confirmation by back-end 206. The match candidate(s) include sequences of '1's followed by a '0' (indicating a match). In this example, the two found match candidates are shown in FIG. 2 as 's c a r r y' and 'f d r h a r r y'.

512-bit/64-byte match pattern 212 is provided as an input to match confirmation logic 214 in back-end 206. As shown in FIG. 2, the match candidate 'f d r h a r r y' is confirmed (to be a match) by match confirmation logic 214, while the match candidate 's c a r r y' is identified as a miss (X) by match confirmation logic 214.

As mentioned above, the FDR algorithm uses an 8-byte chunk SHIFT-OR operation and SIMD instructions in the front-end, which uses a character mask table to do literal matching, wherein the mask table is constructed according to the literal patterns. For performance and/or accuracy reasons, use of the FDR algorithm results in construction of a mask table according to 8-byte chunks.

FIG. 3 illustrates an example diagram of a SHIFT-OR mask table 300 for an FDR algorithm (e.g. FDR algorithm 108). As mentioned above, an FDR algorithm include use of 8-byte chunks or suffixes of patterns in a SHIFT-OR operation and SIMD instructions in the front-end, which uses a character mask table to do literal matching, wherein the mask table is constructed according to literal patterns. For performance and/or accuracy reasons, use of the FDR algorithm results in construction of a SHIFT-OR mask table by processing input data in 8-byte chunks.

According to some examples, if an 8-byte literal pattern of 'f d r h a r r y' is considered, its corresponding SHIFT-OR mask table is shown in FIG. 3 as SHIFT-OR mask table 300. For these examples, SHIFT-OR mask table 300 has 256 rows and 8 columns, indicating a matching result of each character at each position of the 8-byte literal pattern of 'f d r h a r r y'. The 256 character rows represent the 256 characters included in the extended American Standard Code for Information Interchange (ASCII) table (0x00 to 0xff). A cell of SHIFT-OR mask table 300 with a value of '0' indicates that a corresponding character matches a corresponding position of the 8-byte literal pattern of 'f d r h a r r y'.

In some examples, for multiple literal patterns, an FDR algorithm may include a grouping of the multiple literal patterns in different buckets according to their lengths and similarities. The FDR algorithm may support up to 8 buckets by using 8 bits in each cell.

Figure 4:
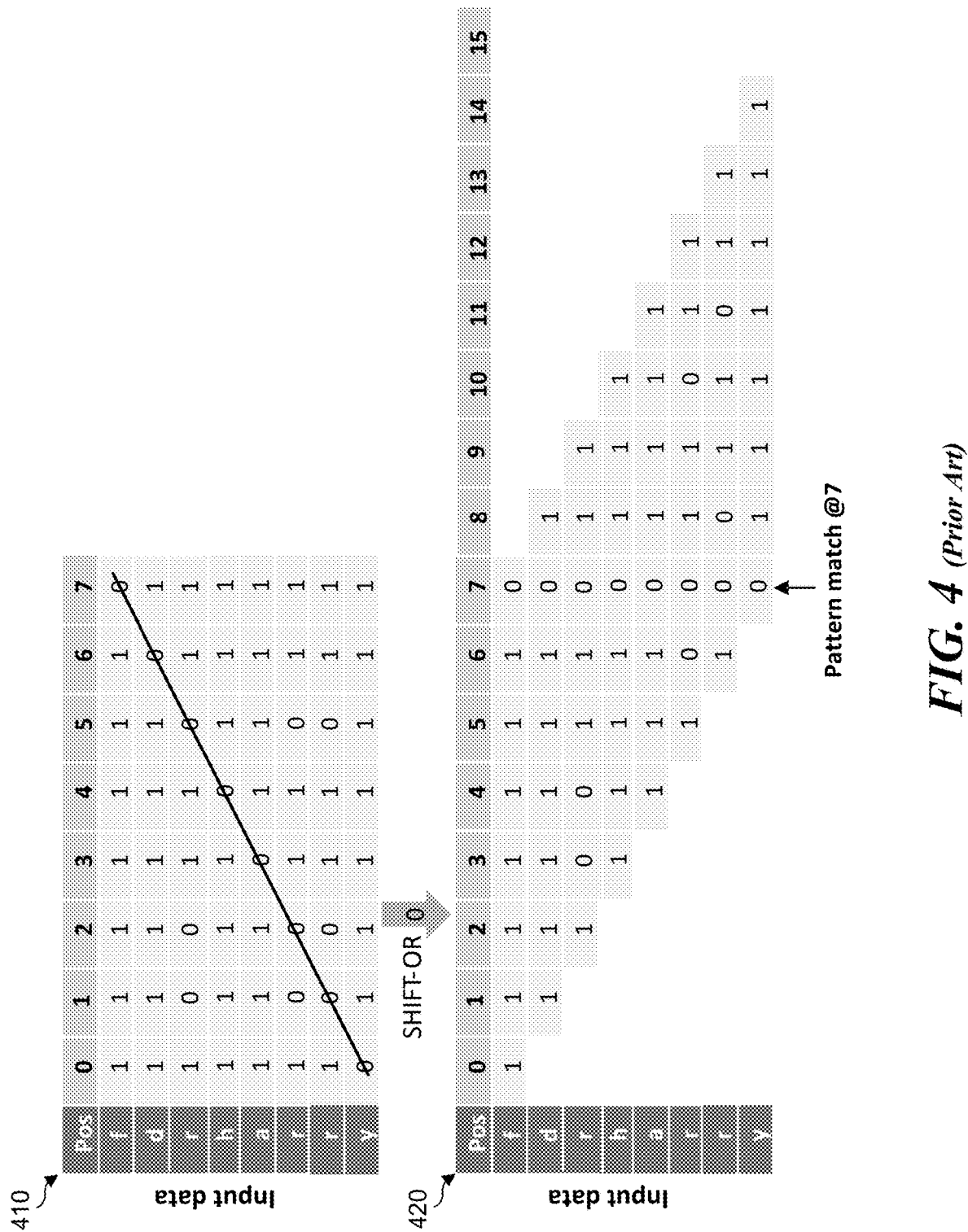
FIG. 4 illustrates an example diagram of a table lookup result from the SHIRT-OR mask table of FIG. 3 and an associated SHIFT-OR result for the FDR algorithm.

FIG. 4 illustrates an example diagram of a table lookup result 410 from the SHIFT-OR mask table 300 shown in FIG. 3 and an associated SHIFT-OR result 420 for the FDR algorithm (e.g., FDR algorithm 108). According to some examples, use of the FDR algorithm includes performance of a SHIFT-OR on an 8-byte chunk of input data. For each input character, use of the FDR algorithm includes loading its mask in a corresponding row of SHIFT-OR mast table 300 into a 128-bit vector, then performing SHIFT and OR operations to identify match candidates in the 8-byte chunk of input data. For example, when processing input data containing 'f d r h a r r y', table lookup result 410 shows the results of a table lookup for SHIFT-OR mask table 300 and SHIFT-OR result 420 shows the result of the SHIFT-OR operations. The column of SHIFT-OR result 420 with all 0s indicates a pattern match at input offset 7.

Match candidates generated from the FDR front-end are called "positives," which are the offsets of '0's as shown in FIG. 4 for pattern match at input offset 7. Every positive will be sent to the back-end (e.g., back-end 206 in FIG. 1) for final confirmation, wherein the back-end will check whether it's a true positive or a false positive.

The FDR algorithm has two problematic issues or pain points for large scale multi-literal matching. A first pain point relates to low table lookup efficiency. Implementation of the FDR algorithm results in loading input character masks byte by byte and then performing SHIFT-OR on these masks. A second pain point relates to low data processing efficiency. Implementation of the FDR algorithm results in processing only 8 bytes at a time using a sequence of 128-bit vector instructions. Implementation of the FDR algorithm cannot process more characters at once efficiently. For example, if the FDR algorithm includes performing SHIFT-OR operations for each 16-byte chunk (double of 8-byte chunk) of input data, the table lookup, SHIFT-OR operations will also be double of an 8-byte chunk, which is still 1 lookup/SHIFT/OR operation per byte. As described more below, the HARRY algorithm addresses these two pain points of the FDR algorithm for large scale multi-literal matching.

Figure 5:
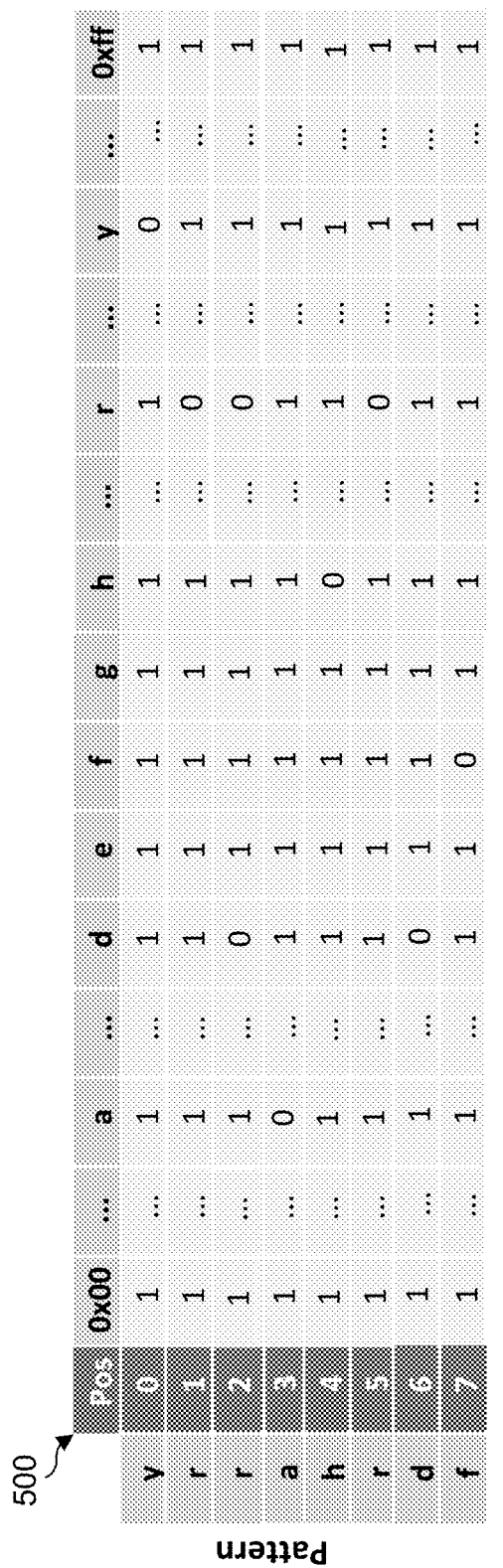
FIG. 5 illustrates an example diagram of a SHIFT-OR mask table for a HARRY algorithm.

FIG. 5 illustrates an example diagram of a SHIFT-OR mask table 500 for a HARRY algorithm (e.g. HARRY algorithm 110). According to some examples, SHIFT-OR mask table 500 is a transposed version of SHIFT-OR mask table 300 shown in FIG. 3 for the FDR algorithm. For these examples, the transposed SHIFT-OR mask table 500, as shown in FIG. 5, includes 8 rows for literal pattern 'f d r h a r r y' and 256 character columns. The 256 character columns represent the 256 characters included in the extended ASCII table (0x00 to 0xff).

Shift-OR mask table 500 may be further simplified if input data is considered as including commonly used characters from the extended ASCII table. These commonly used characters are in the region of 0x00 to 0x7f. According to the extended ASCII table, this region includes 128 characters. As a result of a reduced number of characters, SHIFT-OR mask table 500 could be reduced to 128 columns. A further simplification or reduction in columns can be made if characters in the region of 0x40 to 0x7f (primarily English characters) are considered for input data. According to the extended ASCII table, the region of 0x40 to 0x7f includes 64 characters. According to the extended ASCII table, the low 6-bit values for each of these 64 characters is in the region of 0x00 to 0x3f.

FIG. 6 illustrates an example table 600 for low 6-bit binary values from extended binary values for ASCII symbols to determine hexadecimal values for use in a simplified, SHIFT-OR mask table that includes 64 columns for use in implementing the HARRY algorithm. As shown in FIG. 6, table 600 shows how simplified hexadecimal values for literal pattern 'f d r h a r r y' may be derived based on low 6-bit values from the extended ASCII table for each character in included in the literal pattern 'f d r h a r r y'.

Figure 7:
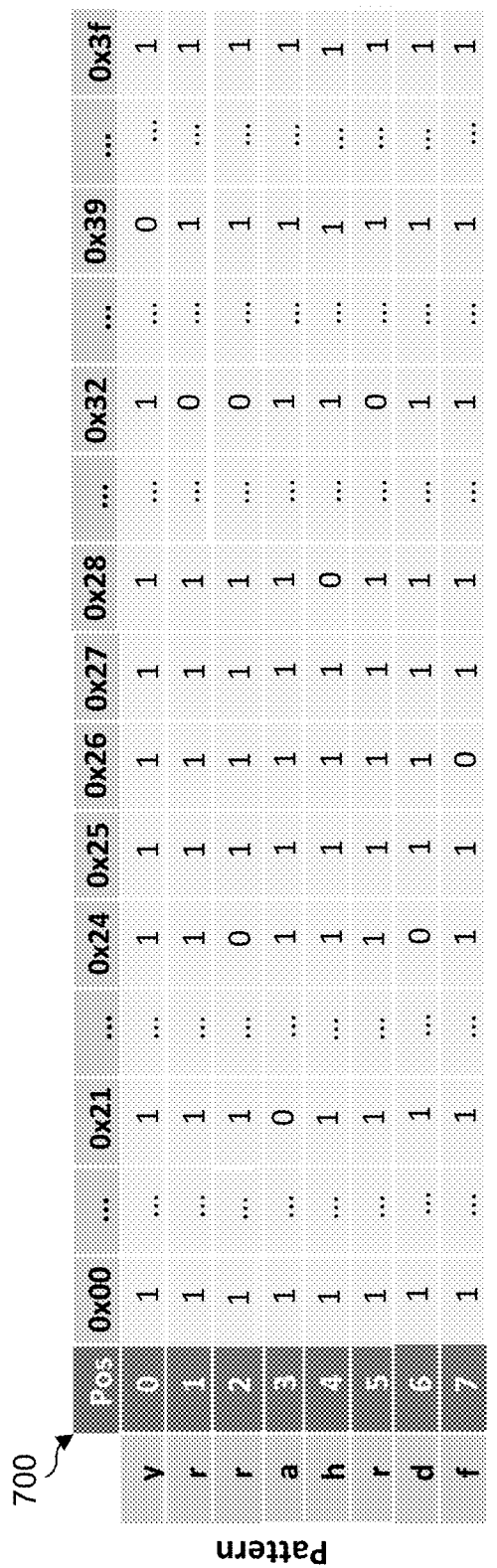
FIG. 7 illustrates an example diagram of the simplified, SHIFT-OR mask table for the HARRY algorithm.

FIG. 7 illustrates an example diagram of the simplified, SHIFT-OR mask table 700 for the HARRY algorithm. According to some examples, the simplified, SHIFT-OR mask table 700 includes 8 rows for literal pattern 'f d r h a r r y' and 64 columns that represent characters in the region of 0x40 to 0x7f of the extended ASCII table but have simplified hexadecimal values based on these character's low 6-bit values. A cell of simplified, SHIFT-OR mask table 700 with a value of '0' represents a match indicia that indicates that a corresponding character matches a corresponding position of the 8-byte literal pattern of 'f d r h a r r y'.

In some examples, the HARRY algorithm leverages a SIMD instruction executed by a processor such as, but not limited to, an AVX-512 VPERMB instruction to perform a parallel table lookup for 64 bytes of input data (e.g., 64 byte character string) based on simplified, SHIFT-OR mask table 700. The processor may include one or more cores and may be an Intel® an AMD®, an ARM® or a RISC-V processor. Some Intel® processors such as, but not limited to, Xeon® processors or some AMD® processors such as, but not limited to Zen® processors may be capable of executing the AVX-512 VPERMB instruction. For these examples, execution of the VPERMB instruction may cause or facilitate a parallel table lookup of all 8 rows of simplified, SHIFT-OR mask table 700 for the 64 bytes of input data. Thus enabling table lookup for a match candidate in the entire 64 bytes of input data at a time compared to the FDR algorithm's ability to perform table lookup of just 8 bytes of input data at a time.

Figure 8:
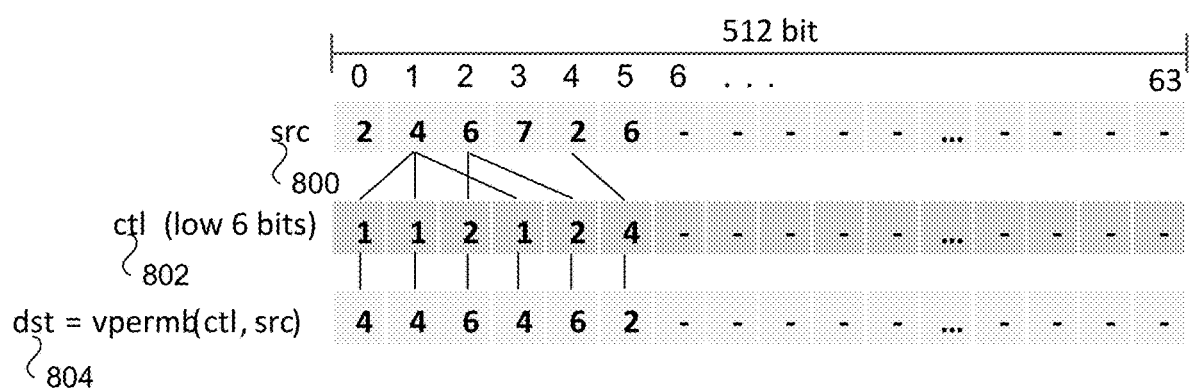
FIG. 8 illustrates an example diagram of a first use of a VPERMB (Permute Packed Bytes Elements) instruction using a first control vector for parallel table lookup.

FIG. 8 illustrates an example diagram of the first use of the VPERMB instruction using a first control vector for parallel table lookup. According to some examples, as shown in FIG. 8, a src operand that is a 64-byte source vector 800 and a ctl (control) operand that is a 64-byte ctl vector 802, and a dst (destination) 804 representing the output resulting from execution of the VPERMB instruction using src operand and ctl operand. Each byte in the 64-byte control vector identifies the lowest 6 bits of the byte-offset from the beginning of the 64-byte source vector, as shown in the byte-offset values 0, 1, 2, 3, 4, 5, 6 . . . above 64-byte source vector 800. For example, the source vector value in the '1' byte offset position is '4'. Thus, for every instance of '1' in 64-byte control vector 802, the output (dst 804) is a 4. Similarly, for every instance of '2' in 64-byte control vector 802, the output for dst 804 is a 6.

In some examples, taking simplified, SHIFT-OR mask table 700 as an example, the HARRY algorithm may perform a pattern match for a 56-byte chunk of input data at a time. First, the HARRY algorithm takes the input chunk of data as a control mask, takes each row of the table as a source mask and leverages VPERMB to do a parallel table lookup for all 8 rows of the simplified, SHIFT-OR mask table 700. Then the HARRY algorithm performs a left-shift for each table lookup result. Finally, the HARRY algorithm performs an OR operation on the left-shifted table lookups to obtain a matching result.

Figure 9:
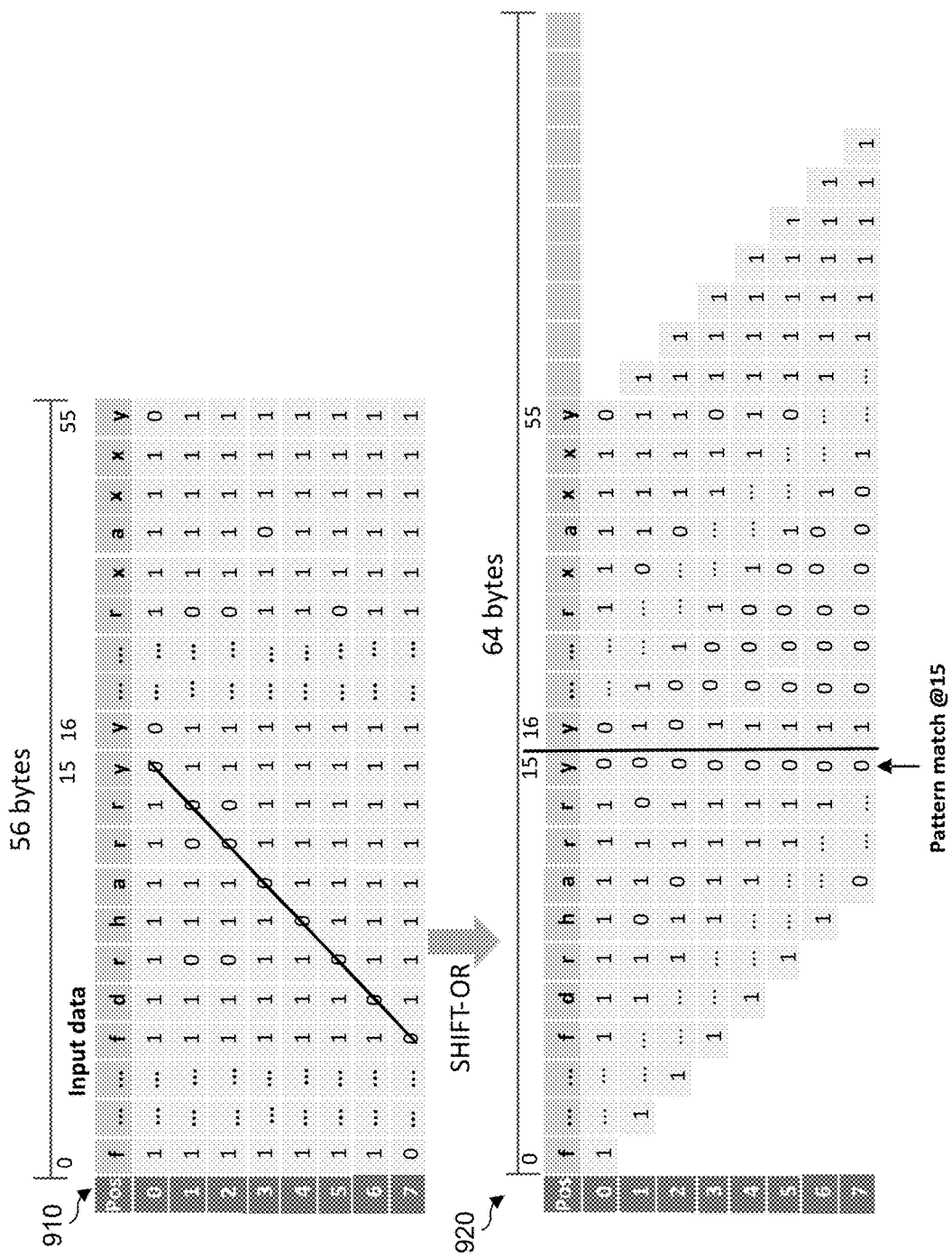
FIG. 9 illustrates an example diagram of a table lookup result from the SHIFT-OR mask table and an associated SHIFT-OR result for the HARRY algorithm.

FIG. 9 illustrates an example diagram of a table lookup result 910 from the simplified, SHIFT-OR mask table 700 and an associated SHIFT-OR result 920 for the HARRY algorithm. According to some examples, as shown in FIG. 9, a pattern match is found at position or offset 15 in SHIFT-OR result 920 indicating an aligned match indicia to the target literal character pattern 'f d r h a r r y' into a single column. For these examples, FIG. 9 shows an ideal SHIFT operation that does not reflect false positive issues at a 128-bit lane boundary.

Figure 10:
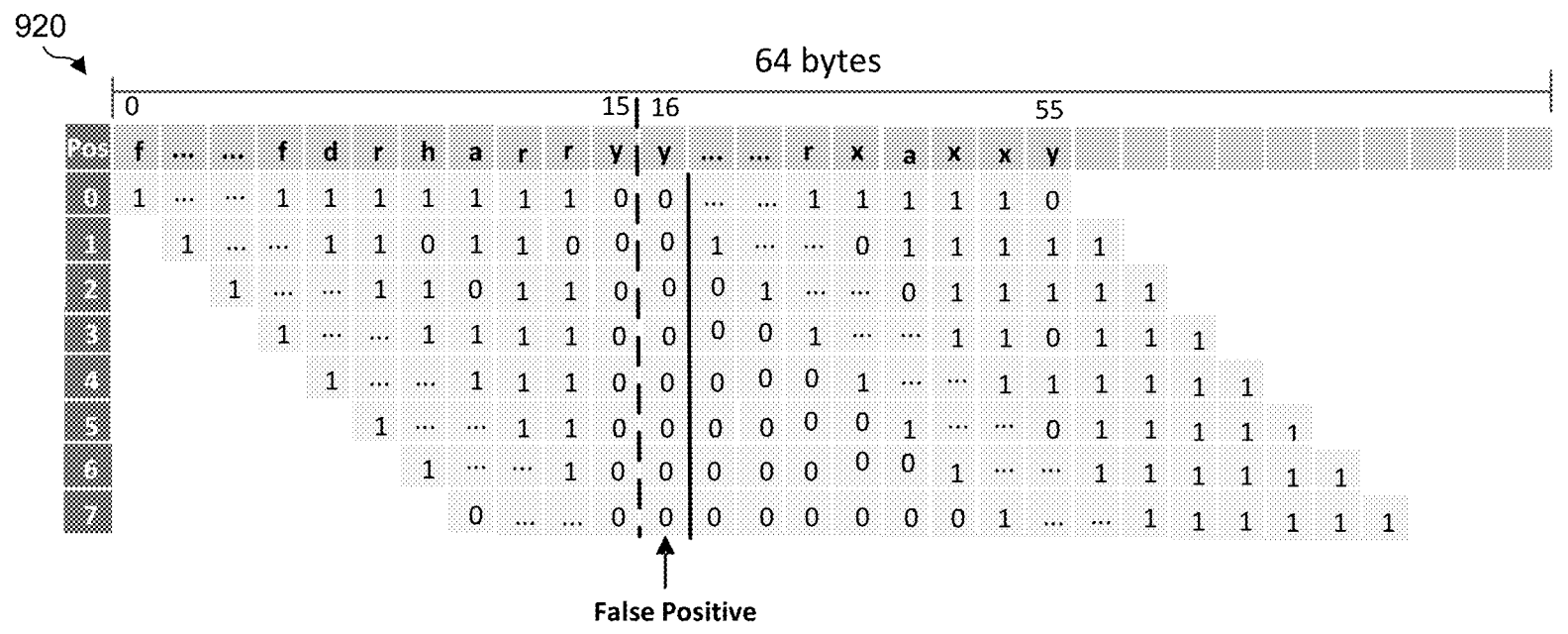

FIG. 10 illustrates an example diagram of a false positive at a 0-bit position of SHIFT-OR result 920 for the HARRY algorithm. As shown in FIG. 10, the false positive at the 0-bit position is at position or offset 16. A no match is expected at position or offset 16, but a SHIFT operation will bring padding zeros at the 128-bit (position 16) lane boundary which causes the false positive at position or offset 16.

Figure 11:
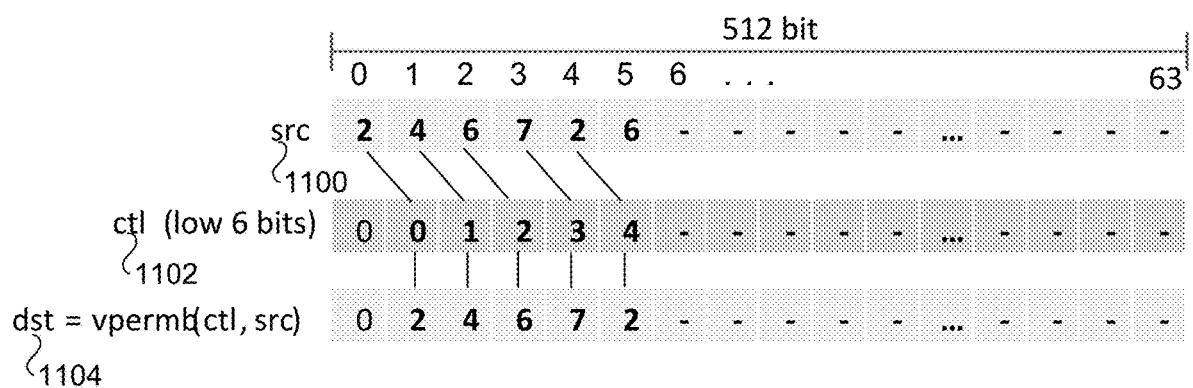
FIG. 11 illustrates an example diagram of a second use of the VPERMB instruction using a second control vector to cause a SHIFT operation crossing a 128-bit boundary.
Figure 12:
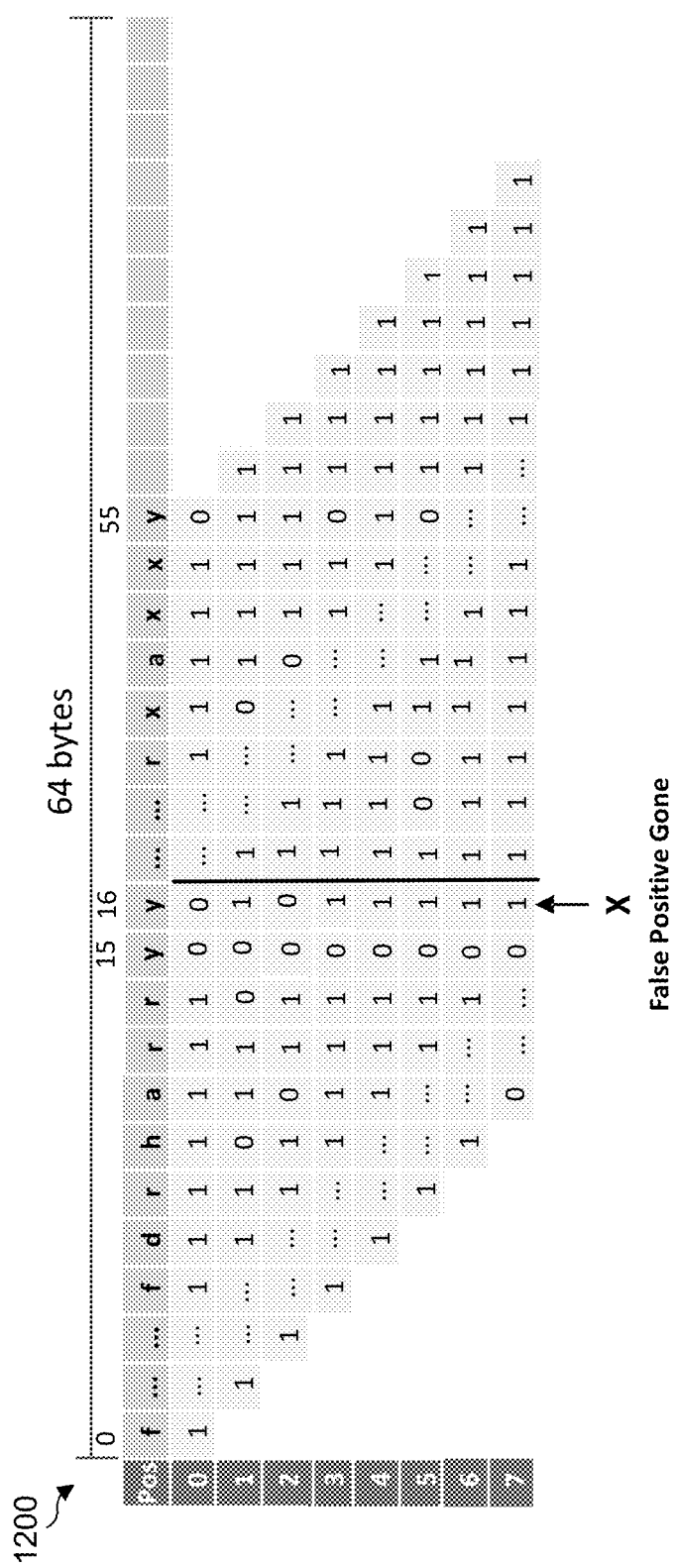
FIG. 12 illustrates an example diagram of a false positive being prevented at the 128-bit boundary.

FIG. 11 illustrates an example diagram of a second use of the VPERMB instruction. using a second control vector to cause a SHIFT operation crossing a 128-bit boundary. According to some examples, as shown in FIG. 11, a src operand that is a 64-byte source vector 1100 and a ctl operand that is a 64-byte ctl vector 1102, and a dst 1104 representing the output resulting from execution of the VPERMB instruction using src operand and ctl operand. For the example shown in FIG. 11, ctl vector 1102 may be defined to perform left-shift by arbitrary bytes. The HARRY algorithm uses this defining of ctl vector 1102 to do all SHIFT operations, from left-shift by 1 byte to left-shift by 7 bytes to avoid false positives as illustrated in FIG. 12. FIG. 12 provides an example diagram of a SHIFT-OR result 1200 via which a false positive was prevented at the 128-bit (16-byte) boundary via the second use of the VPERMB instruction by the HARRY algorithm as mentioned above. As indicated in FIG. 12, the false positive at position or offset 16 is gone. Although not shown in FIG. 12, the VPERMB instruction may also be capable of eliminating false positives at byte offsets of 0, 32 and 48 bytes.

Figure 13:
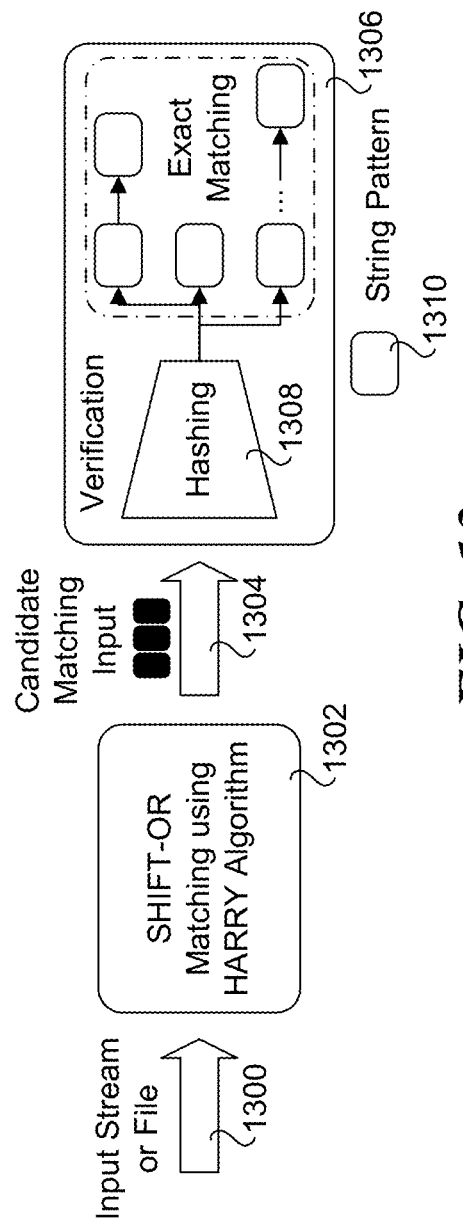
FIG. 13 illustrates an example diagram of a workflow using the HARRY algorithm.

FIG. 13 illustrates an example diagram of a workflow using the HARRY algorithm. According to some examples, the workflow shown in FIG. 13 shows the overall flow for performing search string pattern matching using the advanced multi-literal matching HARRY algorithm disclosed herein. The process is applied to an input character stream or may be applied to stored files and documents, as depicted by an input 1300. In a block 1302, a SHIFT-OR algorithm matching using the HARRY algorithm is employed by the front-end. The result of the front-end operations is a set of match candidates 1304, which are provided as input to the back-end 1306, which performs exact string pattern matching. For these examples, back-end 1306 may apply hashing 1308 to the match candidates, and then uses string pattern 1310 to perform exact matching.

Figure 14:
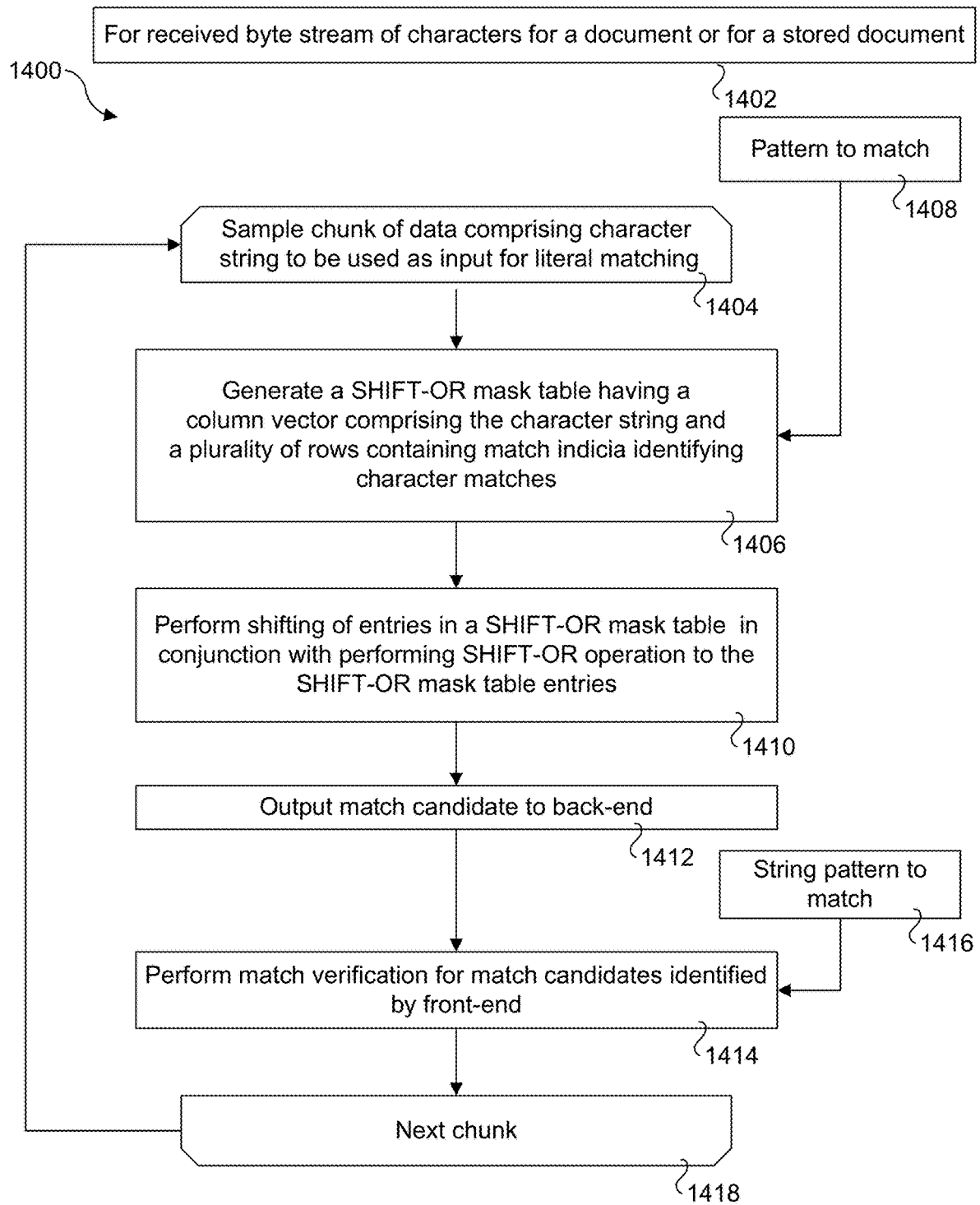
FIG. 14 illustrates an example flowchart on an operation performed by the HARRY algorithm.

FIG. 14 illustrates an example flowchart 1400 on an operation performed by the HARRY algorithm. As shown in a block 1402, the operation is performed for a received byte stream of characters (e.g., included in packetized data) for a document or for a stored file or document. As depicted by a start loop block 1404 and an end loop block 1418, the operations of blocks 1404, 1406, 1410, 1412, and 1414 are performed for each of multiple chunks of data sampled from the byte stream or file.

In some examples, a chunk of data may be a character string having a size n, such as 64 bytes. The character string is used as a column vector, which each character in the n-byte character string occupies a respective column in a SHIFT-OR mask table (e.g., simplified, SHIFT-OR mask table 700) generated in a block 1406 using, in part, a processor executed 512-bit VPERMB SIMD instruction as described above. The other input to block 1406 is pattern to match 1408. The rows of the SHIFT-OR mask table contain match indicia identifying actual (at the byte level) character matches for pattern to match 1408.

In a block 1410, shifting of entries in the SHIFT-OR mask table is performed across the 128-bit (16 byte) boundaries in conjunction with performing the a SHIFT-OR operation to the SHIFT-OR mask table entries. In one embodiment the VPERMB instruction is used with a control vector that results in left-shifting the match indicia in the table rows by an arbitrary number of bytes to prevent false positive across the 128-bit boundaries. In some examples, also as described above, the VPERMB instruction may cause a byte level shuffle of the 64 byte character string according to a 64 byte control vector (e.g., see FIG. 11). For these examples, the 512-bit VPERMB SIMD instruction may cause the byte level shuffle in order to eliminate false positives at byte offsets of 0, 16, 32 and 48 bytes (e.g., see FIG. 12). The output of block 1410 is the match candidate, which is provided to the back-end As shown in a block 1412, block 1410 outputs a match candidate to the back-end, where the match candidate was detected using via the SHIFT-OR operation. In a block 1414 match verification for the match candidate is identified by the front end is performed against string pattern to match 1416. For example, in one embodiment match verification is performed in the manner described above for back-end 1306 in FIG. 13. The process then loops back from end loop block 1418 to start loop block 1404 to evaluate the next chunk of input data.

The HARRY algorithm may be used in a wide variety of use cases where an objective is to identify character strings and/or patterns in any type of alphanumeric content. The following list of use cases is exemplary and non-limiting. Search Engines and Content Search of large Corpus and Databases, Spam Filters, Intrusion Detection System, Plagiarism Detection, Bioinformatics and DNA Sequencing, Digital Forensics, Information Retrieval Systems etc. Various Packet Processing operating on Packet Payload content, including Deep Packet Inspection, Packet Filtering, Packet Switching. Uses in Virtualized Environments such as Application Routing, VM or Container Selection, and Microservices Selection. Pattern Searching of Encrypted Content including Encrypted Memory and Network Data Encryption uses.

The logic or workflow shown in FIG. 14 may be representative of example methodologies for performing novel aspects described in this disclosure. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 15:
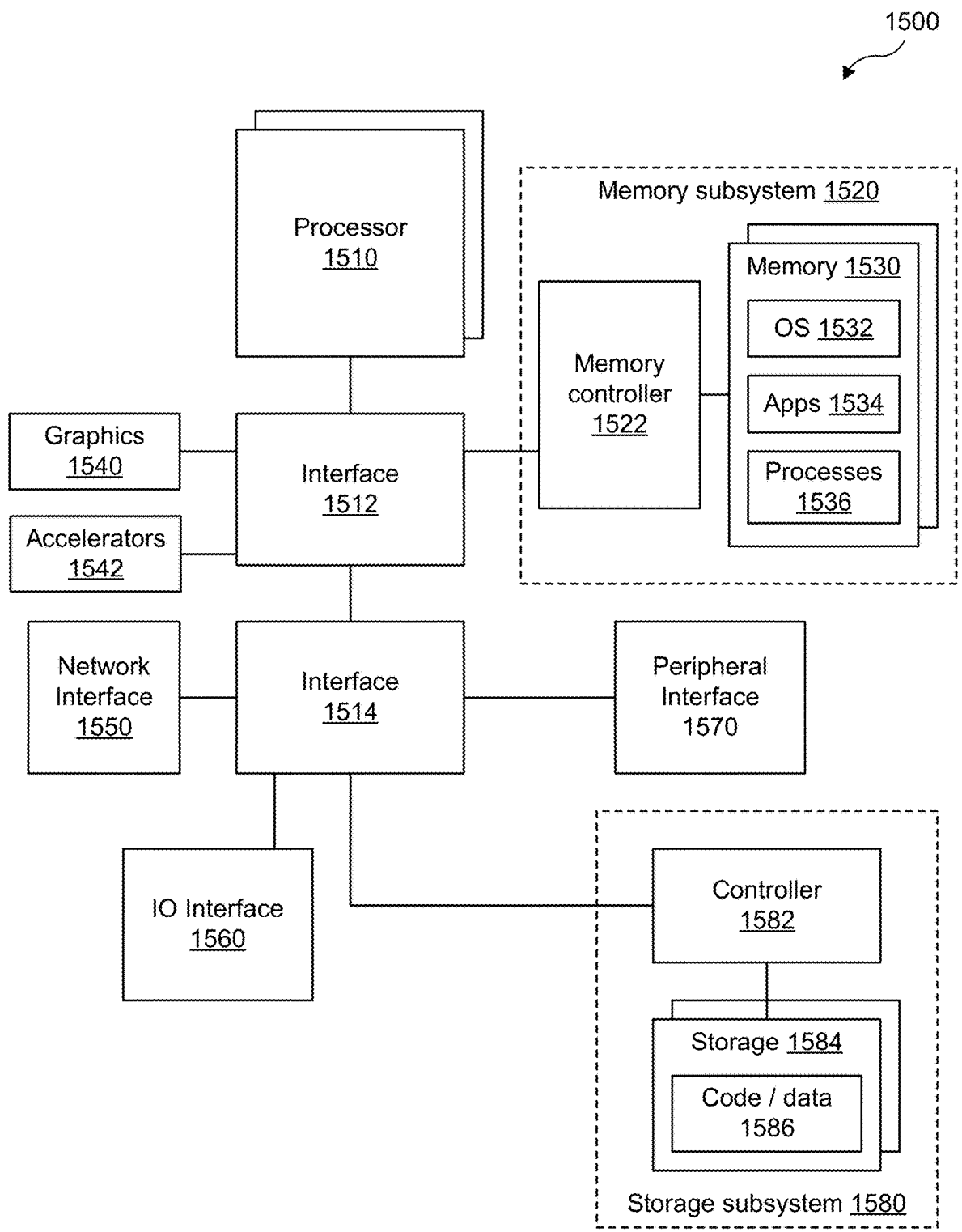
FIG. 15 illustrates an example diagram of a computing system.

FIG. 15 illustrates an example diagram of a computing system 1500. In some examples, computing system 1500 may be a server or similar computing system in which aspects of the embodiments disclosed above may be implemented. Computing system 1500 includes one or more processors 1510, which provides processing, operation management, and execution of instructions for computing system 1500. Processor 1510 can include any type of microprocessor, central processing unit (CPU), graphics processing unit (GPU), processing core, multi-core processor or other processing hardware to provide processing for computing system 1500, or a combination of processors. Processor 1510 controls the overall operation of computing system 1500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

According to some examples, processor 1510 may be an infrastructure processing unit (IPU) or data processing unit (DPU) or may be utilized by an IPU or DPU. An xPU may refer at least to an IPU, DPU, graphic processing unit (GPU), general-purpose GPU (GPGPU). An IPU or DPU may include a network interface with one or more programmable (e.g., network programming language (NPL)) or fixed function processors to perform offload of operations that could have been performed by a CPU. An IPU or DPU may be configured as a network switch with one or more programmable or fixed function processors to perform offload of operations that could have been performed by a CPU (e.g., a smart switch). The IPU or DPU can include one or more memory devices (not shown). In some examples, the IPU or DPU can perform virtual switch operations, manage storage transactions (e.g., compression, cryptography, virtualization), and manage operations performed on other IPUs, DPUs, servers, or devices.

In one example, computing system 1500 includes interface 1512 coupled to processor 1510, which can represent a higher speed interface or a high throughput interface for system components that needs higher bandwidth connections, such as memory subsystem 1520 or optional graphics interface components 1540, or optional accelerators 1542. Interface 1512 represents an interface circuit, which can be a standalone component or integrated onto a processor die. Where present, graphics interface 1540 interfaces to graphics components for providing a visual display to a user of computing system 1500. In one example, graphics interface 1540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1540 generates a display based on data stored in memory 1530 or based on operations executed by processor 1510 or both. In one example, graphics interface 1540 generates a display based on data stored in memory 1530 or based on operations executed by processor 1510 or both.

According to some examples, accelerators 1542 can be a fixed function offload engine that can be accessed or used by a processor 1510. For example, an accelerator among accelerators 1542 can provide data compression capability, cryptography services such as public key encryption (PKE), cipher, hash/authentication capabilities, decryption, or other capabilities or services. In some examples, in addition or alternatively, an accelerator among accelerators 1542 provides field select controller capabilities as described herein. In some cases, accelerators 1542 can be integrated into a CPU socket (e.g., a connector to a motherboard or circuit board that includes a CPU and provides an electrical interface with the CPU). For example, accelerators 1542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1542 can provide multiple neural networks, CPUs, processor cores, general purpose graphics processing units, or graphics processing units can be made available for use by AI or ML models. For example, the AI model can use or include any one or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1520 represents the main memory of computing system 1500 and provides storage for code to be executed by processor 1510, or data values to be used in executing a routine. Memory subsystem 1520 can include one or more memory devices 1530 such as read-only memory (ROM), flash memory, one or more varieties of random access memory (RAM) such as DRAM, or other memory devices, or a combination of such devices. Memory 1530 stores and hosts, among other things, operating system (OS) 1532 to provide a software platform for execution of instructions in computing system 1500. Additionally, applications 1534 can execute on the software platform of OS 1532 from memory 1530. Applications 1534 represent programs that have their own operational logic to perform execution of one or more functions. Processes 1536 represent agents or routines that provide auxiliary functions to OS 1532 or one or more applications 1534 or a combination. OS 1532, applications 1534, and processes 1536 provide software logic to provide functions for computing system 1500. In one example, memory subsystem 1520 includes memory controller 1522, which is a memory controller to generate and issue commands to memory 1530. It will be understood that memory controller 1522 could be a physical part of processor 1510 or a physical part of interface 1512. For example, memory controller 1522 can be an integrated memory controller, integrated onto a circuit with processor 1510.

While not specifically illustrated, it will be understood that computing system 1500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, computing system 1500 includes interface 1514, which can be coupled to interface 1512. In one example, interface 1514 represents an interface circuit, which can include standalone components and integrated circuitry. In one example, multiple user interface components or peripheral components, or both, couple to interface 1514. Network interface 1550 provides computing system 1500 the ability to communicate with remote devices (e.g., servers or other computing devices) over one or more networks. Network interface 1550 can include an Ethernet adapter, wireless interconnection components, cellular network interconnection components, USB (universal serial bus), or other wired or wireless standards-based or proprietary interfaces. Network interface 1550 can transmit data to a device that is in the same data center or rack or a remote device, which can include sending data stored in memory. Network interface 1550 can receive data from a remote device, which can include storing received data into memory. Various embodiments can be used in connection with network interface 1550, processor 1510, and memory subsystem 1520.

In one example, computing system 1500 includes one or more IO interface(s) 1560. IO interface 1560 can include one or more interface components through which a user interacts with computing system 1500 (e.g., audio, alphanumeric, tactile/touch, or other interfacing). Peripheral interface 1570 can include any hardware interface not specifically mentioned above. Peripherals refer generally to devices that connect dependently to computing system 1500. A dependent connection is one where computing system 1500 provides the software platform or hardware platform or both on which operation executes, and with which a user interacts.

In one example, computing system 1500 includes storage subsystem 1580 to store data in a nonvolatile manner. In one example, in certain system implementations, at least certain components of storage 1580 can overlap with components of memory subsystem 1520. Storage subsystem 1580 includes storage device(s) 1584, which can be or include any conventional medium for storing large amounts of data in a nonvolatile manner, such as one or more magnetic, solid state, or optical based disks, or a combination. Storage 1584 holds code or instructions and data 1586 in a persistent state (i.e., the value is retained despite interruption of power to computing system 1500). Storage 1584 can be generically considered to be a "memory," although memory 1530 is typically the executing or operating memory to provide instructions to processor 1510. Whereas storage 1584 is nonvolatile, memory 1530 can include volatile memory (i.e., the value or state of the data is indeterminate if power is interrupted to computing system 1500). In one example, storage subsystem 1580 includes controller 1582 to interface with storage 1584. In one example controller 1582 is a physical part of interface 1514 or processor 1510 or can include circuits or logic in both processor 1510 and interface 1514.

In an example, computing system 1500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

It should be appreciated that the exemplary computing platform 1500 shown in the block diagram of FIG. 15 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Although not depicted, any system can include and use a power supply such as but not limited to a battery, AC-DC converter at least to receive alternating current and supply direct current, renewable energy source (e.g., solar power or motion based power), or the like.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to additional examples of technologies disclosed herein.

Example 1. An example method for performing multi-literal matching may include sampling a chunk of data from a byte stream, the chunk of data to include a character string comprising n bytes. The method may also include identifying a target literal character pattern for which multi-literal matching is performed. The method may also include performing a SHIFT-OR operation using the chunk of data as an input to identify a match candidate for the target literal character pattern. The SHIFT-OR operation shifts to match indicia in a plurality of rows of a SHIFT-OR mask table across predetermined bit boundaries and align the match indicia corresponding to the target literal character pattern into a single column. The SHIFT-OR operation may output zero or a match candidate for the target literal character pattern. The method may also include performing, based on a matched candidate, match verification for the target literal character pattern.

Example 2. The method of example 1, wherein n comprises 64 bytes, and the method is performed by executing one or more 512-bit SIMD instructions on a processor to perform the SHIFT-OR operation as a parallel table lookup of all rows of the SHIFT-OR mask table for the 64 byte character string.

Example 3. The method of example 2, the one or more 512-bit SIMD instructions may include a VPERMB instruction that causes a byte level shuffle in the 64 byte character string according to a 64 byte control vector.

Example 4. The method of example 3, the VPERMB instruction may cause the byte level shuffle in the 64 byte character string to eliminate false positives at byte offsets of 0, 16, 32, and 48 bytes.

Example 5. The method of example 1, the SHIFT-OR mask table may employ character masks at a byte level such that each row of the SHIFT-OR mask table corresponds to a character included in the target literal character pattern.

Example 6. The method of example 1, the method operations may be repeated for a plurality of chunks of data to identify search string matches for a document.

Example 7. The method of example 1, the target literal character pattern may be based on implementing deep packet inspection or intrusion detection and prevention of the byte stream.

Example 8. An example at least one machine readable medium may include a plurality of instructions that in response to being executed by a system may cause the system to carry out a method according to any one of examples 1 to 7.

Example 9. An example apparatus may include means for performing the methods of any one of examples 1 to 7.

Example 10. An example non-transitory tangible machine-readable medium having instructions stored thereon may include a software program or module for performing multi-literal matching of a byte stream. The execution of the instructions may be on a processor of a computing system to enable the computing system to sample a chunk of data from a byte stream, the chunk of data comprising a character string comprising n bytes. The instructions may also enable the computing system to read a target literal character pattern for which multi-literal matching is to be performed. The instructions may also enable the computing system to perform a SHIFT-OR operation using the chunk of data as an input to identify a match candidate for the target literal character pattern, wherein the SHIFT-OR operation shifts match indicia in a plurality of rows of a SHIFT-OR mask table across predetermined bit boundaries and aligns the match indicia corresponding to the target literal character pattern into a single column. The SHIFT-OR operation may output zero or a match candidate for the target literal character pattern. The instructions may also enable the computing system to perform, based on a matched candidate, match verification for the target literal character pattern.

Example 11. The non-transitory tangible machine-readable medium of example 10, n may be 64 bytes and the instructions include one or more 512-bit SIMD instructions to perform the SHIFT-OR operation as a parallel table lookup of all rows of the SHIFT-OR mask table for the 64 byte character string.

Example 12. The non-transitory tangible machine-readable medium of example 11, the one or more 512-bit SIMD instructions may include a VPERMB instruction that causes a byte level shuffle in the 64 byte character string according to a 64 byte control vector.

Example 13. The non-transitory tangible machine-readable medium of example 12, the VPERMB instruction may cause the byte level shuffle in the 64 byte character string to eliminate false positives at byte offsets of 0, 16, 32, and 48 bytes.

Example 14. The non-transitory tangible machine-readable medium of example 10, the SHIFT-OR mask table may employ character masks at a byte level such that each row of the SHIFT-OR mask table corresponds to a character included in the target literal character pattern.

Example 15. The non-transitory tangible machine-readable medium of example 10, the target literal character pattern may be based on implementing deep packet inspection or intrusion detection and prevention of the byte stream.

Example 16. An example computing system may include a processor, coupled to memory, having a plurality of cores on which instructions are executed. The instructions may include a software program or module for performing multi-literal matching of a byte stream. Execution of the instructions on a processor of a computing system enables the computing system to sample a chunk of data from a byte stream. The chunk of data may include a character string of n bytes. The computing system may also be enabled to read a target literal character pattern for which multi-literal matching is to be performed and perform a SHIFT-OR operation using the chunk of data as an input to identify a match candidate for the target literal character pattern. The SHIFT-OR operation may shift match indicia in a plurality of rows of a SHIFT-OR mask table across predetermined bit boundaries and align the match indicia corresponding to the target literal character pattern into a single column. The SHIFT-OR operation may output zero or a match candidate for the target literal character pattern. The computing system may also be enabled to perform, based on a matched candidate, match verification for the target literal character pattern.

Example 17. The computing system of example 16, n may be 64 bytes, and the instructions may include one or more 512-bit SIMD instructions to perform the SHIFT-OR operation as a parallel table lookup of all rows of the SHIFT-OR mask table for the 64 byte character sample 16, the one or more 512-bit SIMD instructions may include a VPERMB instruction that causes a byte level shuffle in the 64 byte character string according to a 64 byte control vector.

Example 19. The computing system of example 18, the VPERMB instruction may cause the byte level shuffle in the 64 byte character string to eliminate false positives at byte offsets of 0, 16, 32, and 48 bytes.

Example 20. The computing system of example 16, the SHIFT-OR mask table may employ character masks at a byte level such that each row of the SHIFT-OR mask table corresponds to a character included in the target literal character pattern.

Example 21. The computing system of example 16, the target literal character pattern may be based on implementing deep packet inspection or intrusion detection and prevention of the byte stream for the document or for the stored document.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for performing multi-literal matching, comprising:
   sampling a chunk of data from a byte stream, the chunk of data comprising a character string comprising n bytes;
   identifying a target literal character pattern for which multi-literal matching is performed;
   performing a SHIFT-OR operation using the chunk of data as an input to identify a match candidate for the target literal character pattern, wherein the SHIFT-OR operation shifts match indicia in a plurality of rows of a SHIFT-OR mask table across predetermined bit boundaries and aligns the match indicia corresponding to the target literal character pattern into a single column, the SHIFT-OR operation outputting zero or a match candidate for the target literal character pattern; and
   performing, based on a matched candidate, match verification for the target literal character pattern.

2. The method of claim 1, wherein n comprises 64 bytes, and the method is performed by executing one or more 512-bit single input multiple data (SIMD) instructions on a processor to perform the SHIFT-OR operation as a parallel table lookup of all rows of the SHIFT-OR mask table for the 64 byte character string.

3. The method of claim 2, wherein the one or more 512-bit SIMD instructions comprises a VPERMB (Permute Packed Bytes Elements) instruction that causes a byte level shuffle in the 64 byte character string according to a 64 byte control vector.

4. The method of claim 3, wherein the VPERMB instruction is to cause the byte level shuffle in the 64 byte character string to eliminate false positives at byte offsets of 0, 16, 32, and 48 bytes.

5. The method of claim 1, wherein the SHIFT-OR mask table employs character masks at a byte level such that each row of the SHIFT-OR mask table corresponds to a character included in the target literal character pattern.

6. The method of claim 1, wherein the method operations are repeated for a plurality of chunks of data to identify search string matches for a document.

7. The method of claim 1, wherein the target literal character pattern is based on implementing deep packet inspection or intrusion detection and prevention of the byte stream.

8. A non-transitory tangible machine-readable medium having instructions stored thereon comprising a software program or module for performing multi-literal matching of a byte stream, wherein execution of the instructions on a processor of a computing system enables the computing system to:
   sample a chunk of data from a byte stream, the chunk of data comprising a character string comprising n bytes;
   read a target literal character pattern for which multi-literal matching is to be performed;
   perform a SHIFT-OR operation using the chunk of data as an input to identify a match candidate for the target literal character pattern, wherein the SHIFT-OR operation shifts match indicia in a plurality of rows of a SHIFT-OR mask table across predetermined bit boundaries and aligns the match indicia corresponding to the target literal character pattern into a single column, the SHIFT-OR operation outputting zero or a match candidate for the target literal character pattern; and
   perform, based on a matched candidate, match verification for the target literal character pattern.

9. The non-transitory tangible machine-readable medium of claim 8, wherein n comprises 64 bytes, and wherein the instructions include one or more 512-bit single input multiple data (SIMD) instructions to perform the SHIFT-OR operation as a parallel table lookup of all rows of the SHIFT-OR mask table for the 64 byte character string.

10. The non-transitory tangible machine-readable medium of claim 9, wherein the one or more 512-bit SIMD instructions comprises a VPERMB (Permute Packed Bytes Elements) instruction that causes a byte level shuffle in the 64 byte character string according to a 64 byte control vector.

11. The non-transitory tangible machine-readable medium of claim 10, wherein the VPERMB instruction is to cause the byte level shuffle in the 64 byte character string to eliminate false positives at byte offsets of 0, 16, 32, and 48 bytes.

12. The non-transitory tangible machine-readable medium of claim 8, wherein the SHIFT-OR mask table employs character masks at a byte level such that each row of the SHIFT-OR mask table corresponds to a character included in the target literal character pattern.

13. The non-transitory tangible machine-readable medium of claim 8, wherein the target literal character pattern is based on implementing deep packet inspection or intrusion detection and prevention of the byte stream.

14. A computing system, comprising:
   a processor, coupled to memory, having a plurality of cores on which instructions are executed; and
   instructions comprising a software program or module for performing multi-literal matching of a byte stream for a document or for a stored document, wherein execution of the instructions on a processor of a computing system enables the computing system to:
- sample a chunk of data from a byte stream, the chunk of data comprising a character string comprising n bytes;
- read a target literal character pattern for which multi-literal matching is to be performed;
- perform a SHIFT-OR operation using the chunk of data as an input to identify a match candidate for the target literal character pattern, wherein the SHIFT-OR operation shifts match indicia in a plurality of rows of a SHIFT-OR mask table across predetermined bit boundaries and aligns the match indicia corresponding to the target literal character pattern into a single column, the SHIFT-OR operation outputting zero or a match candidate for the target literal character pattern; and
- perform, based on a matched candidate, match verification for the target literal character pattern.

15. The computing system of claim 14, wherein n comprises 64 bytes, and wherein the instructions include one or more 512-bit single input multiple data (SIMD) instructions to perform the SHIFT-OR operation as a parallel table lookup of all rows of the SHIFT-OR mask table for the 64 byte character string.

16. The computing system of claim 15, wherein the one or more 512-bit SIMD instructions comprises a VPERMB (Permute Packed Bytes Elements) instruction that causes a byte level shuffle in the 64 byte character string according to a 64 byte control vector.

17. The computing system of claim 16, wherein the VPERMB instruction is to cause the byte level shuffle in the 64 byte character string to eliminate false positives at byte offsets of 0, 16, 32, and 48 bytes.

18. The computing system of claim 14, wherein the SHIFT-OR mask table employs character masks at a byte level such that each row of the SHIFT-OR mask table corresponds to a character included in the target literal character pattern.

19. The computing system of claim 14, wherein the target literal character pattern is based on implementing deep packet inspection or intrusion detection and prevention of the byte stream.

* * * * *